Jan. 24, 1961
H. H. GROBECKER
2,969,000
CHAMFERING TOOL
Filed Sept. 24, 1957
2 Sheets-Sheet 2
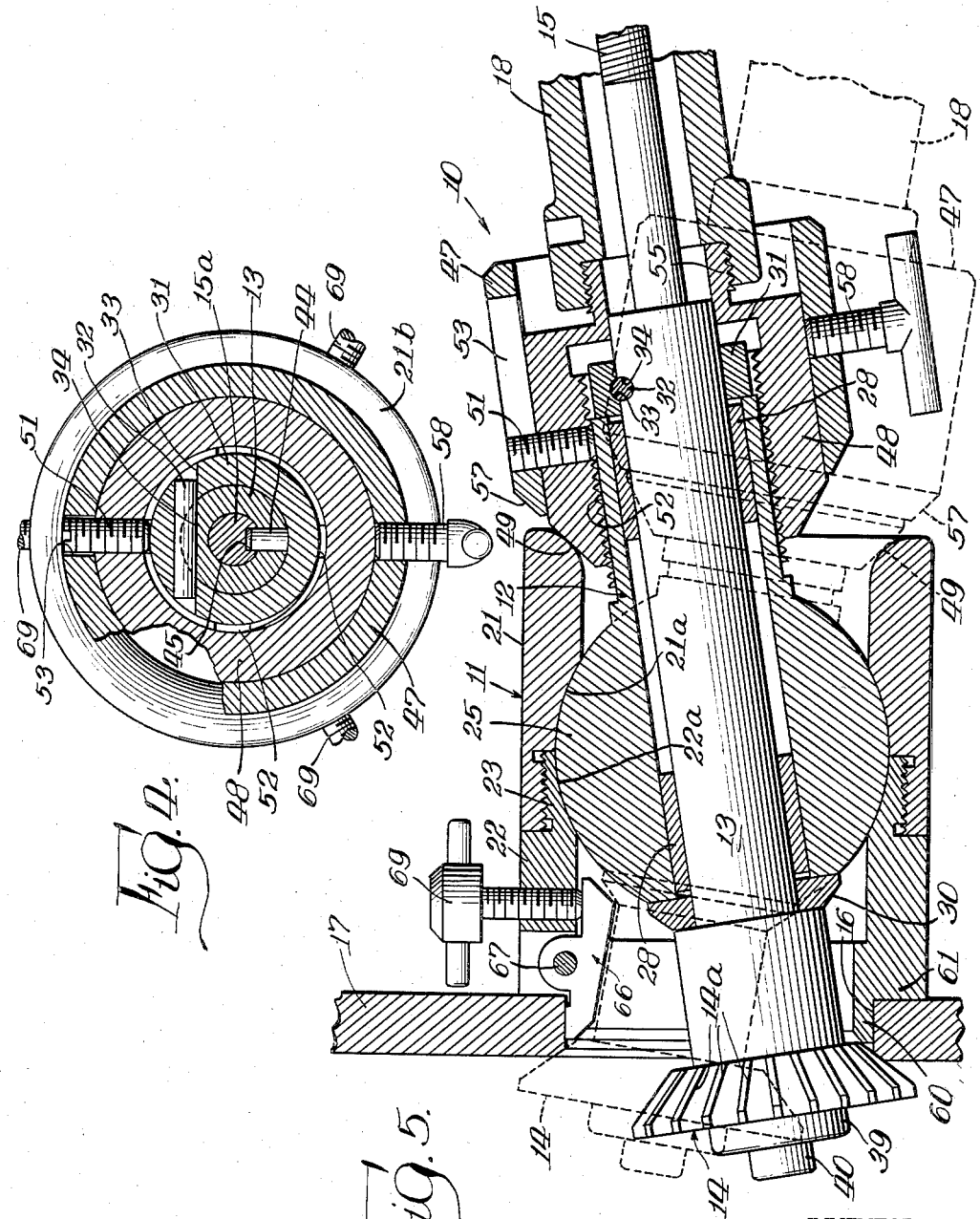
INVENTOR.
Hugo H. Grobecker,
BY Schroeder, Hofgren,
Brady & Wegner
Atty's United States Patent Office 2,969,000
Patented Jan. 24, 1961

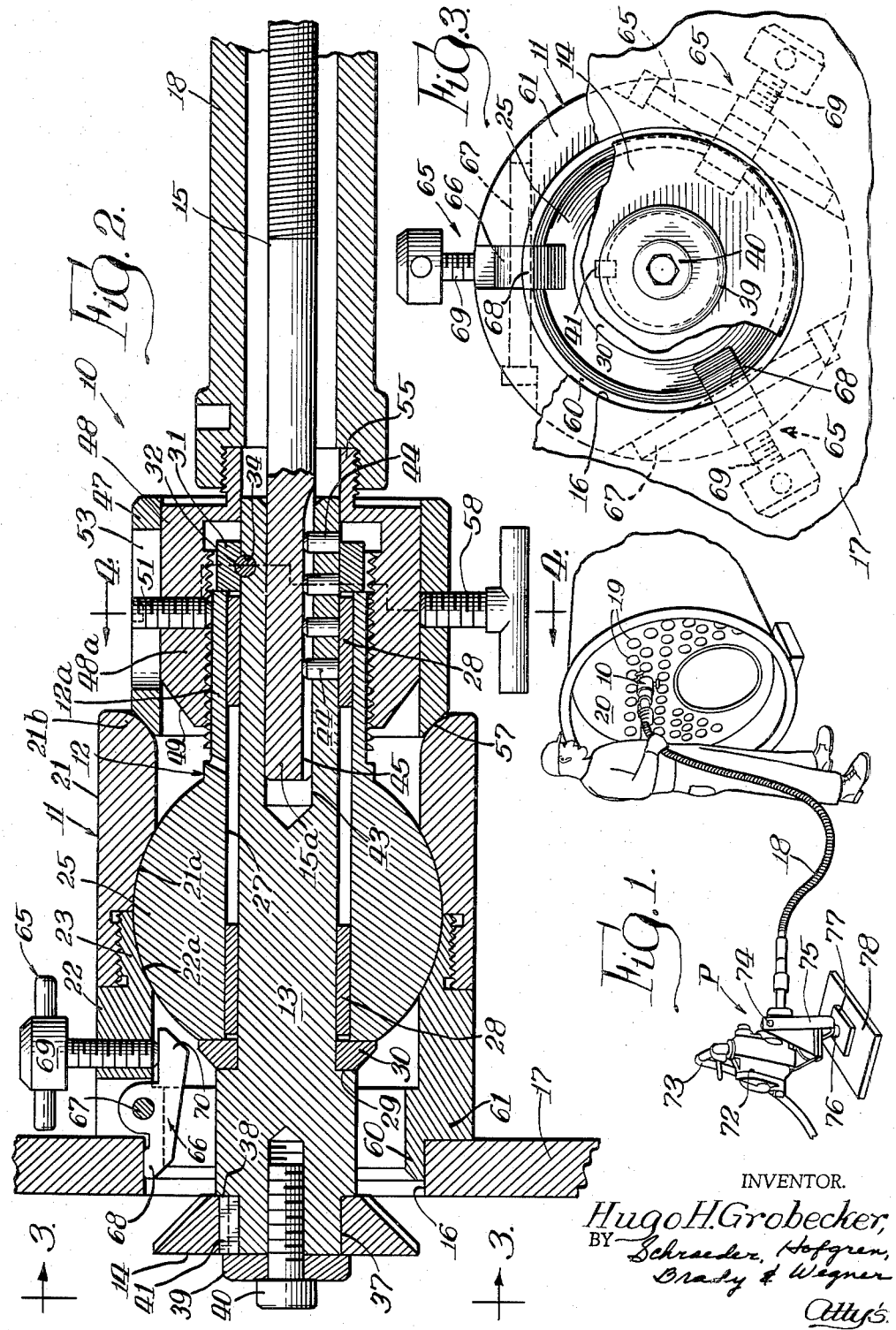

2,969,000
CHAMFERING TOOL

Hugo H. Grobecker, Milwaukee, Wis., assignor to Cleaver-Brooks Company, a corporation of Wisconsin
Filed Sept. 24, 1957, Ser. No. 685,948
7 Claims. (Cl. 90—12)

This invention relates to chamfering tools, and particularly to backface chamfering tools of the type provided for chamfering the back edge of an opening through a plate or the like.

It is a general object of the invention to provide a new and improved chamfering tool of the character described.

A more specific object of the invention is to provide a new and improved chamfering tool of the type described which is readily portable but sturdy, which is power operated, and which may be easily handled by a single operator working from the front face of a plate or the like to chamfer the back edge of an opening through the plate.

Another object is to provide a chamfering tool of the character described including a tubular housing which is positionable adjacent the front face of a plate or the like and which carries a cutter drive shaft mounted therein for rotation and for universal tilting movement so that a cutter on the shaft may be rolled around the back edge of a plate opening while rotating.

A further object is to provide a new and improved chamfering tool of the type described including means for centering the tubular housing relative to the plate opening and means for clamping the housing in position on the plate.

Another object is to provide a new and improved chamfering tool of the type described including means for centering the cutter shaft in the housing to permit insertion of the cutter through the plate opening.

An additional object is to provide a new and improved chamfering tool of the character mentioned including means for limiting the tilting movement of the cutter drive shaft to regulate the depth of cut.

Another object is to provide a new and improved chamfering tool of the type described including a flexible power shaft having a driving connection with the cutter drive shaft to rotate the shaft as it is tilted to roll the cutter around the back edge of the plate opening.

Other objects and advantages will become readily apparent from the following detailed description taken in connecting with the accompanying drawings, in which:

Fig. 1 is a perspective view illustrating the use of a chamfering tool embodying the principles of the present invention for chamfering plate openings in a boiler tube sheet or the like;

Fig. 2 is an enlarged longitudinal sectional view through the central axis of the chamfering tool;

Fig. 3 is an end elevational view of the chamfering tool, taken at about the line 3—3 of Fig. 2;

Fig. 4 is a transverse sectional view taken substantially on the line 4—4 of Fig. 2; and Fig. 5 is a longitudinal sectional view through the chamfering tool, similar to Fig. 2, but with the cutter positioned to engage the back edge of the plate opening.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

As demonstrated in Fig. 1, the invention is embodied in a chamfering tool generally designated 10 which is readily portable and easily handled by a single operator. As seen in Fig. 2, the tool 10 includes a tubular housing 11, a tubular bearing member 12 mounted in the housing for universal tilting movement, and a cutter shaft 13 rotatable in the tubular bearing member. One end of the drive shaft projects outwardly beyond the tubular housing and has a wheel-shaped cutter 14 secured thereon.

The opposite end of the cutter shaft 13 has a driving connection with a flexible power shaft 15 to establish and maintain rotation of the cutter shaft as the bearing member 12 is tilted to roll the cutter 14 (Fig. 5) around the back edge of a circular opening 16 in a plate 17 or the like. The power shaft 15 is encased in a protective casing 18 which is also flexible and which serves to enclose the power shaft and thereby prevent contact by the operator. As illustrated in Fig. 1, the flexible power shaft 15 is driven by a portable power unit P which may be easily moved about in a machine shop or the like thereby facilitating movement of the tool from place to place. The embodiment of the tool chosen for illustration is particularly adapted for use in chamfering the backface edges around circular openings 19 in a boiler tube sheet, such as that illustrated at 20, in preparation for securing tubes to the tube sheet in alignment with the openings.

Referring now particularly to Figs. 2 and 5, the tubular housing 11 includes two tubular portions, 21 and 22, which are secured together, the portion 22 having a reduced end 23 which is externally threaded, and the portion 21 being internally threaded and screwed onto the end 23. Internally, the tubular portions 21 and 22 are formed with annular recesses 21a and 22a, respectively, which are complementary and together form an inner annular groove of concave cross-section which provides a seat for a ball-shaped bearing 25 integrally formed externally on the tubular bearing member 12. In assembly of the tool, the tubular bearing member 12 is first inserted in the tubular housing portion 22, with the ball-shaped bearing 25 seated in the recess 22a. The tubular housing portion 21 is then threaded onto the end 23 to retain the tubular bearing member 12 and to provide, together with the housing portion 22, a seat for the bearing 25, thereby mounting the bearing member 12 for universal tilting movement in the housing 11.

The bearing member 12 is formed with a longitudinal bore 27 which receives near opposite ends a pair of sleeve-type bearings 28 of hardened metal material such as bronze which rotatably support the cutter drive shaft 13. The cutter shaft is shouldered at 29 and the shoulder thus formed abuts against a bearing collar 30 which in turn abuts against one end of the tubular bearing member 12. At the opposite end of the bearing member 12, a retaining collar 31 is fitted on the cutter shaft 13 and abuts against bearing member 12 to retain the shaft 13 against axial movement relative to the member 12. The retaining collar 31 is held in place on the cutter shaft by a dowel pin 32 which is fitted in a chordal bore 33 in the collar and in a tangential groove 34 on the shaft 13.

At one end, the shaft 13 is reduced as illustrated at 37 to receive the chamfering cutter 14 which abuts a shoulder 38 and which is held in place by a retaining washer 39 in turn held by a machine screw 40 threaded into the end of the cutter shaft 13. The cutter is keyed against rotation on the cutter shaft by a key 41 fitted in complementary key slots in the cutter and shaft. The cutter 14 has an outer diameter slightly less than the opening 16 in the plate to be chamfered, so that the cutter may be inserted through the opening without engaging the wall of the opening. As illustrated best in Fig. 5, the cutting edges 14a of the cutter are conically inclined relative to the axis of the cutter shaft so that the cutting edges engage the back edge of the plate 17 around the opening 16 when the bearing member 12 is tilted as illustrated in Fig. 5.

At the opposite end of the cutter shaft from that on which the cutter is secured, the shaft is formed to provide a driving connection with the flexible power shaft 15. As illustrated, the cutter shaft is formed with a longitudinal bore 43 (Fig. 2) which receives a rigid end portion 15a of the power shaft. The cutter shaft 13 and the power shaft 15 are retained against relative rotation by means of pins 44, four as illustrated, radially positioned in the cutter shaft 13 and projecting into the bore 43 to engage in an elongated slot or key way 45 provided in the end portion 15a of the power shaft. The pins 44 in the slot 45 provide a driving connection between the power shaft 15 and the cutter shaft 13 while readily permitting connection and disconnection of the shafts by inserting or removing the end portion 15a from the bore 43.

During the period when the tool is being positioned as illustrated in Fig. 2 in preparation for a chamfering operation, the tubular bearing member 12 is held in a centered position in the housing 11 to facilitate insertion of the cutter 14 through the opening 16. This is accomplished by means of a centering collar 47 which is axially adjustable on a stop collar 48 in turn mounted on the bearing member 12 for regulating the tilting movement of the bearing member to limit the depth of cut.

The stop collar 48 comprises a major portion 48a which is internally threaded and screwed onto the externally threaded end portion 12a of the tubular bearing member. The stop collar 48 is formed at one end with a conically shaped annular surface 49 adapted for engagement with the rounded annular end 21b of the housing portion 21, as best illustrated in Fig. 5. It will be seen that on tilting the bearing member 12 as in Fig. 5, the annular surface 49 on the stop collar engages the annular surface at the end of the housing portion 21 to limit tilting of the bearing member and to limit movement of the cutter and thereby limit the depth of cut. At the same time, the annular surface 49 may be rolled around the end surface of the housing operation 21 to thereby roll the cutter, as it rotates, around the back edge of the plate opening.

The threaded mounting of the stop collar 48 on the bearing member 12 facilitates axial adjustment of the collar which may be retained in adjusted positions by means of a set screw 51 threaded radially through the stop collar to bear on the threaded portion of the bearing member. The bearing member is preferably provided with a plurality, four as illustrated, of circumferentially spaced longitudinally extending slots 52 formed in the threaded portion of the bearing member 12 to receive the inner end of the set screw 53. Outwardly, the set screw 51 projects through an axially extending slot 53 provided in the centering collar 47.

The outer end of the stop collar 48 is reduced as illustrated at Fig. 5 and is externally threaded for reception of an internally threaded end of the flexible casing 18 which encloses the power shaft 15. In this manner, the rotatable cutter shaft and the power shaft 15 are completely encased and protected from contact by the operator.

The centering collar 47 is slidably fitted on the stop collar 48 for axial adjustment between an advanced position illustrated in Fig. 2 and a retracted position illustrated in Fig. 5. In the advanced position of the centering collar, a conically shaped annular surface 57 at the end of the collar engages the end of the housing portion 21 to hold the bearing member 12 in the centered position illustrated wherein the axis of the bearing member is coincident with the axis of the housing 11 to facilitate insertion of the cutter 14 through the opening 16. After the tool has been properly positioned as illustrated in Fig. 2, the centering collar may be retracted to the withdrawn position illustrated in Fig. 5 to permit tilting movement of the bearing member 12 under control of the stop collar 48. The centering collar is retained in adjusted positions by means of a set screw 58 radially positioned in the collar to bear on the outer surface of the stop collar 48.

In order to properly position the tool for a chamfering operation and to retain the tool in position during chamfering, the end of the housing portion 22 adjacent the cutter is reduced externally as illustrated at 60 to provide a centering guide adapted to fit in the plate opening 16. Adjacent the centering guide, the housing portion 22 is shouldered as illustrated at 61 to provide an end surface which abuts the plate 17 around the opening 16. The centering guide and the abutting end surface on the housing together function to align the housing properly relative to the plate opening.

At the end adjacent the cutter, the housing is provided with clamping means for holding the tool in position for the chamfering portion. As illustrated, the clamping means includes three separate clamps 65 each comprising a clamping member 66 having an intermediate portion pivoted on a pin 67 in the housing portion 22. Each clamping member 66 is formed with a radially outwardly facing clamping surface at one end 68 adapted to bear against the plate 17 in the opening 16 when clamping pressure is applied to the opposite end of the clamping member. As best seen in Fig. 3, the clamps 65 are equally spaced circumferentially around the housing 11, and the clamping members 66 therefore oppose each other to thereby hold the housing in position when clamping pressure is applied. As illustrated, force is applied to each clamping member 66 by means of a clamping screw 69 radially positioned in the housing portion 22 and engageable with the inner end 70 of the clamping member.

Preferably, the power unit illustrated at P includes a vane-type hydraulic motor 72 which may be supplied with fluid under pressure through a conduit 73 from any suitable source. The motor is pivoted on a horizontal axis at 74 in a cradle 75 which in turn is pivoted on a vertical axis 76 on a base 77 secured to a stable base plate 78. It will be understood, of course, that other power units may be employed if desired.

In operation, the desired cutter is chosen and attached to the cutter shaft. The power shaft 15 is connected to the cutter shaft, and the casing 18 connected to the stop collar 48. The centering collar 47 is moved to the advanced position illustrated in Fig. 2 to hold the bearing member 12 in the centered position for insertion of the cutter through the plate opening. The housing 11 is positioned with the centering guide in the plate opening and with the end surface of the housing portion 22 abutting the front face of the plate 17 around the plate opening. The clamping screws 69 are tightened to clamp the housing to the plate 17 to securely position the tool. After the tool is positioned, the centering collar 47 is withdrawn to the retracted position of Fig. 5, after which the bearing member 12 may be tilted under control of the stop collar 48 so as to roll the rotating cutter around the back edge of the plate opening to chamfer or bevel the edge.

After the chamfering operation is completed, the centering collar is again moved to the advanced position of Fig. 2 during the retraction of the cutter through the plate opening. The clamping screws 69 are loosened to release the clamping pressure whereupon the cutter may be withdrawn and moved on to the next opening.

While the tool has been illustrated in the connection with the chamfering of plate openings in tube sheets, it will be appreciated that the tool will have other uses than in boiler construction, that it may be used for purposes other than chamfering, and that cutters other than that illustrated at 14 may be employed if desired.

I claim:

1. A chamfering tool, comprising, a tubular housing, a tubular bearing member extending through the housing, means mounting the bearing member for universal pivotal movement in the housing, a cutter shaft rotatably mounted in the bearing member, an annular cutter secured on one end of said shaft for rotation therewith, an annular stop on the housing, and an annular stop on the bearing member engageable with the first recited stop when the bearing member is tilted in the housing thereby to limit tilting movement of the bearing member equally in all directions.

2. A backface chamfering tool, comprising, a tubular housing having one end adapted to abut the front face of a plate, around an opening through the plate, a tubular bearing member extending through the housing, means mounting the bearing member for universal tilting movement in the housing, a cutter shaft rotatable in the bearing member and having one end projecting outwardly beyond said one end of the housing, an annular backface chamfering cutter secured to said one end of the shaft exteriorly of the housing to project through the opening in the plate when the housing abuts the plate, said bearing member being tiltable in the housing to roll the cutter around the back edge of the plate opening, an annular stop on the housing, an annular stop on the bearing member engageable with the stop on the housing when the bearing member is tilted in the housing thereby to limit the tilting movement of the bearing member in the housing equally in all directions as the cutter is rolled around the plate opening, and means mounting one stop for axial adjustment thereby to vary the maximum angle of tilt and the depth of cut.

3. A chamfering tool, comprising, a tubular housing, a tubular bearing member in the housing, means mounting the bearing member for universal tilting movement in the housing, a cutter shaft rotatable in the bearing member and having one end portion projecting outwardly beyond one end of the housing, an annular cutter secured on said one end of the shaft to project through a plate opening, said bearing member being tiltable in the housing to roll the cutter around the back edge of the plate opening, an annular stop collar secured on the bearing member movable therewith and having an outer annular surface thereon engageable with an annular surface on the tubular housing to limit tilting movement of the bearing member equally in all directions, and a centering collar axially movable on the stop collar between a first position engaging the housing to hold the bearing member centered in the housing for insertion of the cutter through a plate opening and a second position spaced from the housing to free the bearing member for tilting to permit movement of the cutter around the back edge of the plate opening.

4. A portable chamfering tool, comprising, a tubular housing, a tubular bearing member mounted in the housing for universal tilting movement, a cutter drive shaft rotatable in the bearing member, an annular chamfering cutter secured on said shaft for rotation therewith adjacent one end of the housing, a flexible power shaft slidably keyed to the opposite end of the drive shaft to drive the latter, said bearing member being tiltable in the housing to roll the cutter around a plate opening while a driving connection is maintained between the power shaft and the cutter shaft to continuously rotate the cutter, a stop collar axially adjustable on the bearing member and having an outer annular surface engageable with an annular surface on the tubular housing to limit movement of the bearing member in all directions, and a flexible casing enclosing the flexible power shaft and secured at one end to the stop collar.

5. A backface chamfering tool, comprising, a tubular housing having one end adapted to abut the front face of a plate around an opening through the plate, a tubular bearing member extending through the housing, means mounting the bearing member for universal tilting movement in the housing, a cutter shaft rotatable in the bearing member and having one end projecting outwardly beyond said one end of the housing, an annular backface chamfering cutter secured to said one end of the shaft exteriorly of the housing to project through the opening in the plate when the housing abuts the plate, said bearing member being tiltable in the housing to roll the cutter around the back edge of the plate opening, an annular stop on the housing, and a centering collar axially movable on the bearing member between a first position engaging the stop on the housing to hold the bearing member centered in the housing and a second position spaced from the stop on the housing to free the bearing member for tilting movement.

6. A backface chamfering tool, comprising, a tubular housing having one end adapted to abut the front face of a plate around an opening through the plate and having an inner annular groove of semi-ball shaped cross section providing a seat for a ball-shaped bearing, a tubular bearing member extending through the housing and having an external ball-shaped bearing in said seat mounting the bearing member for universal tilting movement in the housing, a cutter shaft rotatable in the bearing member and having one end projecting outwardly beyond said one end of the housing, an annular backface chamfering cutter secured to said one end of the shaft exteriorly of the housing to project through the opening in the plate when the housing abuts the plate, said bearing member being tiltable in the housing to roll the cutter around the back edge of the plate opening, an annular stop on the housing at the opposite end thereof, an annular stop collar on the bearing member having an annular stop engageable with the stop on the housing when the bearing member is tilted in the housing thereby to limit tilting movement of the bearing member, means mounting one stop for axial adjustment relative to the other, an annular centering collar on the stop collar movable axially between a first position engaging the annular stop on the housing to hold the bearing member centered in the housing and a second position freeing the bearing member for tilting movement in the housing, and means for securing the centering collar in either position on the stop collar.

7. A portable chamfering tool for chamfering the edge of a plate about a circular opening therein, comprising, a tubular housing, locating means on the housing adjacent one end thereof removably engageable with the plate around an opening in the plate to thereby locate the tool relative to the plate, a tubular bearing member mounted in the housing for universal tilting movement, a cutter shaft rotatable in the bearing member and restrained against axial movement, a chamfering cutter secured on the cutter shaft for rotation therewith adjacent said one end of the housing and having an annular series of cutting teeth conically inclined relative to the axis of the shaft and engageable with the edge of the plate about the opening therein when the locating means is engaged with the plate and the cutter shaft is tilted, a flexible drive shaft drivingly connected to the cutter shaft at the end thereof opposite that supporting the cutter, a flexible casing enclosing the flexible drive shaft, and means connecting the end of the casing to the bearing member so that the cutter shaft and the drive shaft are encased and may be manipulated while rotating to roll the cutter around the plate opening by manually grasping the casing.

References Cited in the file of this patent
UNITED STATES PATENTS

| | | |
|---|---|---|
| 343,769 | Levi | June 15, 1886 |
| 2,073,861 | Wolf | Mar. 16, 1937 |
| 2,164,741 | Green | July 4, 1939 |
| 2,439,009 | Kujawski | Apr. 6, 1948 |
| 2,510,820 | Hermanson | June 6, 1950 |
| 2,674,184 | Forbes | Apr. 6, 1954 |
| 2,679,061 | Baker | May 25, 1954 |
| 2,785,593 | Wing | Mar. 19, 1957 |

FOREIGN PATENTS

| | | |
|---|---|---|
| 539,238 | France | Mar. 30, 1922 |